(12) United States Patent
Arakawa

(10) Patent No.: US 7,003,689 B2
(45) Date of Patent: Feb. 21, 2006

(54) DISK STORAGE APPARATUS FOR AUDIO VISUAL DATA AND RETRY METHOD EMPLOYED THEREIN UPON OCCURRENCE OF SECTOR ERROR

(75) Inventor: Yutaka Arakawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 488 days.

(21) Appl. No.: 10/291,574

(22) Filed: Nov. 12, 2002

(65) Prior Publication Data

US 2003/0163759 A1   Aug. 28, 2003

(30) Foreign Application Priority Data

Feb. 28, 2002   (JP) .............................. 2002-054900

(51) Int. Cl.
*G06F 11/00*   (2006.01)

(52) U.S. Cl. .............................. 714/8; 714/42; 360/53

(58) Field of Classification Search ................. 714/42, 714/8; 360/53; 369/53.17, 53.15
See application file for complete search history.

(56) References Cited

U.S. PATENT DOCUMENTS

| | | | | |
|---|---|---|---|---|
| 5,751,947 A * | 5/1998 | Arakawa | ...................... | 714/54 |
| 6,049,891 A * | 4/2000 | Inamoto | ........................ | 714/6 |
| 6,434,711 B1 * | 8/2002 | Takiyanagi | .................... | 714/8 |
| 6,728,053 B1 * | 4/2004 | Choo et al. | .................... | 360/53 |
| 6,766,465 B1 * | 7/2004 | Harada | ........................... | 714/2 |
| 2001/0010605 A1 * | 8/2001 | Aoki | ........................... | 360/53 |

FOREIGN PATENT DOCUMENTS

| | | |
|---|---|---|
| CN | 1168474 A | 9/1997 |
| JP | 5-217297 | 8/1993 |
| JP | 8-212721 | 8/1996 |
| JP | 10-255403 | 9/1998 |
| JP | 2001-5616 | 1/2001 |
| JP | 2001-195835 | 7/2001 |
| JP | 2001-216746 | 8/2001 |
| JP | 2001-357623 | 12/2001 |
| WO | WO 98/03970 | 1/1998 |

OTHER PUBLICATIONS

Austrian Patent Office Search Report for Application No. 200206606-6 dated Jul. 8, 2004.
Japanese Office Action, dated Jun. 22, 2004 for Patent Application No. 2002-054900.
Chinese Office Action dated Aug. 5, 2005 for Appln. No. 02152680.X.

* cited by examiner

Primary Examiner—Robert Beausoliel
Assistant Examiner—Yolanda L Wilson
(74) Attorney, Agent, or Firm—Pillsbury Winthrop Shaw Pittman, LLP

(57) ABSTRACT

A CPU computes a maximum allowable time period for restoration of a sector in which an error occurs, on the basis of a command processing time period designated by a host, when the error occurs upon access to the disk designated by a command supplied from the host, the command processing time period enabling realtime processing. The CPU also determines the use of the computed maximum allowable time period as a maximum error retry time period. The CPU controls the retry of the sector within the determined maximum error retry time period.

10 Claims, 4 Drawing Sheets

DISK STORAGE APPARATUS FOR AUDIO VISUAL DATA AND RETRY METHOD EMPLOYED THEREIN UPON OCCURRENCE OF SECTOR ERROR

CROSS-REFERENCE TO RELATED APPLICATIONS

This application is based upon and claims the benefit of priority from the prior Japanese Patent Application No. 2002-054900, filed Feb. 28, 2002, the entire contents of which are incorporated herein by reference.

BACKGROUND OF THE INVENTION

1. Field of the Invention

The present invention relates to a disk storage apparatus in which an arbitrary sector in an alternate area provided on a disk is allocated as an alternate sector, and more particularly to a disk storage apparatus used to record AV (Audio Visual) data, and also to a retry method employed therein upon occurrence of a sector error.

2. Description of the Related Art

At present, there is a tendency to raise the storage capacity of a disk storage apparatus such as a hard disk drive (hereinafter referred to simply as an "HDD"). Accordingly, HDDs have now come to be used as AV HDDs. AV HDDs are used to record AV data, such as digital music data, digital video data, etc.

In AV HDDs, it is regarded as important to process AV data in real time. To this end, AV HDDs have a function for automatically substituting, for a normal sector, a defective sector, if it exists on, for example, a magnetic disk. This function enables continuous use of AV HDDs without reducing the access rate, even if there is a defective sector.

As is known, a disklike magnetic medium, i.e., a magnetic disk, is used as a recording medium in HDDs. It is desirable that magnetic disks should have no defects. However, in general, it is considered unavoidable, in light of manufacturing processes, that magnetic disks have several defects. Defects on magnetic disks are classified into two types. The first type of defect (defective sectors) are detected by examination executed before HDDs are shipped. The defective sectors are then substituted by normal sectors. The second type of defect (defective sectors) occurs after HDDs are shipped, during actual use by a user.

Concerning the first type of defect, the degree, number, etc. of defects can be detected. The occurrence of problems can be avoided by stopping the shipping of products if the detection result requires it. However, the second type of defect occurs at random while users are using HDDs. Accordingly, it is a matter of course that an alternate process must be executed upon detection of a second type defect. Further, there is a demand for shortening the time required for this process.

HDDs have, until recently, mostly been used as external storages for computers. Therefore, the accuracy of data stored in HDDs is very important. In the disk drive described in, for example, Jpn. Pat. Appln. KOKAI Publication No. 10-255403, a sufficient restoration time is provided to enable a retry operation to be executed on an error (sector error) during reading/writing of data in a data sector. In this disk drive, restoration of the error is attempted during the restoration time. Only if the error sector is not restored is it subjected to an alternate process.

Some recent HDDs automatically allocate a normal sector in place of a defective sector, i.e., automatically execute an alternate process. For the verification of the defective sector, a lot of time is used, since, as stated above, HDDs have been used as external storages for computers. Specifically, in conventional HDDs, retry (error retry) is executed not more than a predetermined number of times on a sector that may be defective. In error retry, data is read or written from or to a sector that may be defective. Only if the error sector is not restored even after error retry is executed a predetermined number of times is the sector considered a defective one and subjected to an alternate process. Thus, in the process executed upon detection of a sector error in conventional HDDs, much more time is required for verification of a defective sector, i.e., for error retry, than for an alternate process.

As described above, in conventional HDDs, a process in which verification of a defective sector is regarded as important is executed in light of the fact that HDDs have been used as external storages for computers. Therefore, a lot of time is required for error retry executed on a sector that may be defective. This means that, in conventional HDDs, even when retry has succeeded, it is difficult to realize realtime processing of AV data. In other words, conventional HDDs are not appropriate as AV HDDs.

Furthermore, in the conventional HDDs, there is a case where the sector, in which an error has once occurred, is temporarily restored after error retry is executed thereon for a long time. In this case, the sector is not subjected to an alternate process. However, if conventional HDDs are used as AV HDDs, the time that can be used for processing a sector error is limited, and hence it is possible that an error will occur in the temporarily restored sector.

BRIEF SUMMARY OF THE INVENTION

The present invention has been developed in light of the above circumstances, and aims to provide a disk storage apparatus for AV data that enables realtime processing when AV data stored therein is accessed, by using the maximum allowable time period for error sector restoration calculated on the basis of the command processing time period designated by a host, as the maximum error retry time period for error retry executed upon occurrence of a sector error. The invention also provides a retry method used upon occurrence of a sector error in the disk storage apparatus.

According to an aspect of the invention, there is provided a disk drive apparatus for AV data in which an arbitrary sector provided in an alternate area on a disk is allocated as an alternate sector for a defective sector on the disk, comprising: means for computing a maximum allowable time period for restoration of a sector in which an error occurs, on the basis of a command processing time period designated by a host using the disk storage apparatus, when the error occurs upon access to the disk designated by a command supplied from the host, the command processing time period enabling realtime processing; means for determining use of the computed maximum allowable time period as a maximum error retry time period; and means for controlling retry of the sector, in which the error occurs, within the determined maximum error retry time period.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
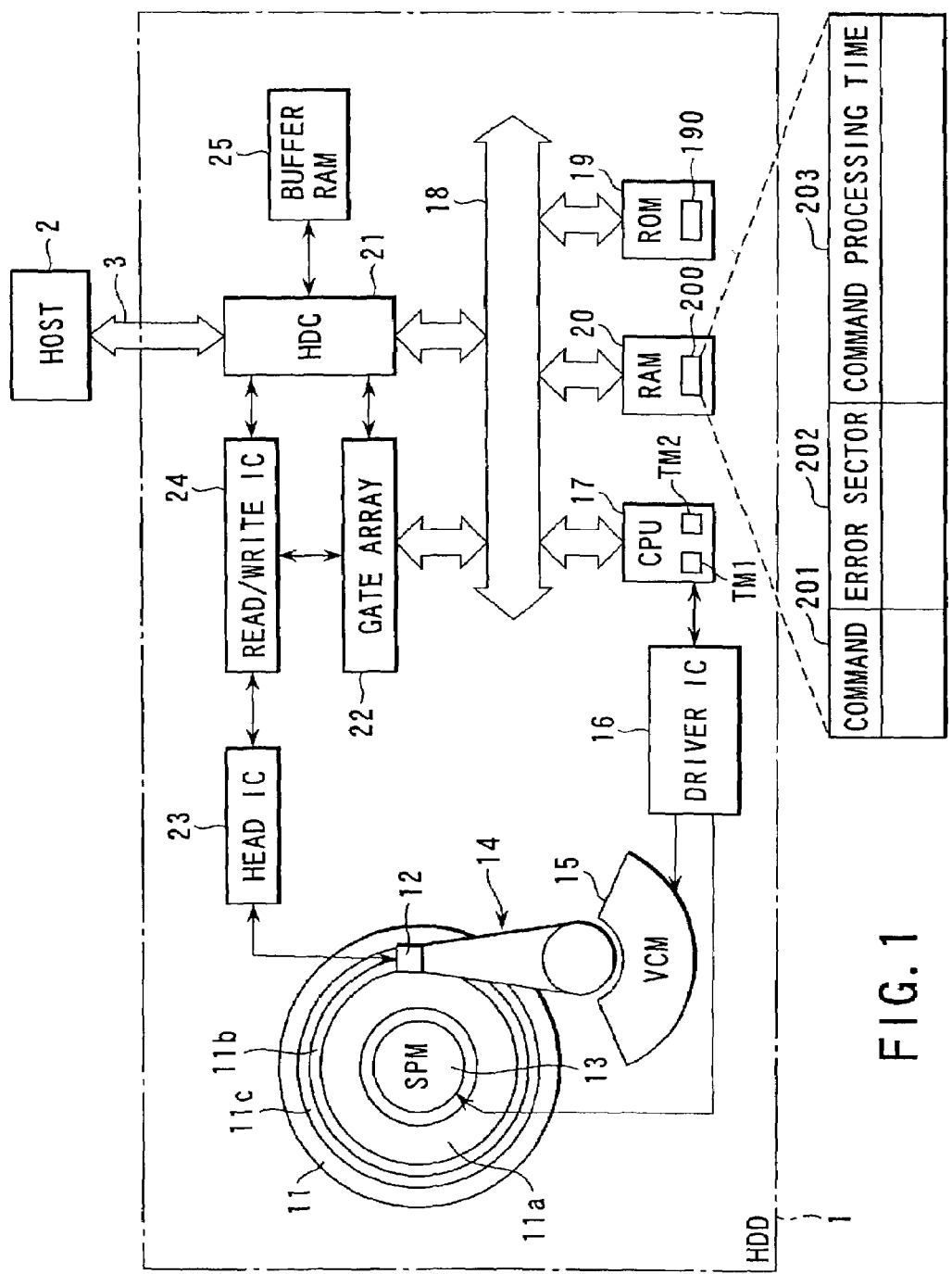
FIG. 1 is a block diagram illustrating a hard disk drive according to an embodiment of the invention.

An embodiment in which the invention is applied to an AV hard disk drive for recording/reproducing AV data will be described with reference to the accompanying drawings. FIG. 1 is a block diagram illustrating a hard disk drive 1 according to the embodiment of the invention. The hard disk drive (hereinafter referred to as an "HDD") 1 shown in FIG. 1 is provided with a disk (magnetic disk) 11. The disk 11 has two, i.e., upper and lower, surfaces. One or both of the two surfaces of the magnetic disk are used as recording surfaces on which data is magnetically recorded. A head (magnetic head) 12 is provided for each recording surface of the disk 11. The head 12 is used to write data to the disk 11 (data recording) and to read data from the disk 11 (data reproduction). Although the HDD shown in FIG. 1 is assumed to have a single disk 11, it may have a plurality of stacked disks 11.

Each recording surface of the magnetic disk has a large number of concentric data tracks (physical tracks). Further, each recording surface comprises a user area 11a, alternate area 11b and management area 11c. The user area 11a is for the user's use. The alternate area 11b has an alternate track serving as an alternate destination for a defective sector. The management area 11c is used to store information necessary for system management (system management information). The system management information includes defective sector management information indicative of the correspondency between a defective sector, and the sector allocated in place of the defective sector. The defective sector management information includes the address of a defective sector and that of the sector allocated in place of the defective one. In the example of FIG. 1, the alternate area 11b is a ring area provided outside the user area 11a. However, the alternate area 11b may be provided inside the user area 11a, or may be formed of two portions; one inside and the other outside the user area 11a. Further, a CDR (Constant Density Recording) format may be applied to the disk 11. In this case, since the user area 11a is divided into a plurality of ring zones, an alternate area may be provided in each zone. The alternate area 11b and management area 11c are used only by the system. In other words, these areas are non-user areas that cannot be seen by the user. The area formed of alternate area 11b and management area 11c is called the "system area". Further, there is a case where only the management area 11c is called "system area".

The disk 11 is rotated at high speed by a spindle motor (hereinafter referred to as an "SPM") 13. The head 12 is attached to the free end of an actuator (carriage) 14. The head 12 is radially moved in accordance with the swing operation of the actuator 14. As a result, the head is positioned to a target track. The actuator 14 has a voice coil motor (hereinafter referred to as a "VCM") 15 serving as a drive source for the actuator 14. Thus, the actuator 14 is driven by the VCM 15. The SPM 13 and VCM 15 are powered by driving currents independently supplied from a driver IC (Integrated Circuit) 16. The driver IC 16 is a motor driver in the form of an IC chip, and serves as SPM and VCM drivers. The values (control variables) for determining the driving currents to be supplied from the driver IC 16 to the SPM 13 and VCM 15 are determined by a CPU 17.

The CPU 17 is the main controller of the HDD. The CPU 17 controls read/write operations of a disk controller 21, described later, in accordance with the read/write command from a host 2. The host 2 is a digital device using the HDD 1 as, for example, an AV HDD. Further, the CPU 17 executes positioning control for positioning the head 12 on the target track by driving the actuator 14 via the driver IC 16. The CPU 17 also determines the maximum allowable time period for restoring a sector which may be defective, i.e., the maximum error retry time period (verification time period), on the basis of the command processing time period requested by the host 2. The CPU 17 accesses a sector that may be defective, on the basis of an error log described later. If the sector is again determined to be possibly defective as a result of the access, the CPU 17 executes error retry. If the sector is not restored even by error retry within the maximum error retry time period, the CPU 17 executes an alternate process on the sector. The CPU 17 contains timers TM1 and TM2. The timer TM1 is used to measure the time required for command processing per each sector. The timer TM2 is used to manage the retry time period for error retry.

The CPU 17 is connected to a CPU bus 18. The CPU bus 18 is connected to a ROM (Read Only Memory) 19, RAM (Random Access Memory) 20, disk controller (hereinafter referred to as an "HDC") 21 and gate array 22. The ROM 19 prestores a control program executed by the CPU 17. The RAM 20 is a storage device which provides an error log area 200 as well as a work area (not shown) for the CPU 17. The error log area 200 logs an error each time the maximum error retry time period, in which a sector that may be defective is subjected to error retry, has elapsed. Error retry is executed when an error has occurred during execution of a read/write command supplied from the host 2. The error log includes information in fields 201–203. In the field 201, the command in which an error (sector error) has occurred is stored. The command in which an error has occurred is the command that has designated reading/writing of data from/to sectors including a sector (error sector) in which an error occurs. The command stored in the field 201 includes the type of read/write operation (command type), the address of a leading sector at which a read/write operation is started, and the number of sectors at which the read/write operation is executed. In the field 202, the address of an error sector is set. In the field 203, information concerning a command processing time period CT for each sector is set. The command processing time period CT is the maximum time period that can be used for each sector to process, in real time, the data designated by a command. In other words, if each sector cannot be processed within the command processing time period CT, the data designated by the command cannot be processed in real time. The command processing time period CT per each sector can be supplied from the host 2 to the HDD 1 in the form of (CT*the number of sectors). In this case, to determine the command processing time period CT for each sector, it is necessary to divide (CT*the number of sectors) by the number of sectors. Alternatively, the command processing time period CT itself may be supplied from the host 2 to the HDD 1.

The HDC 21 is connected to the aforementioned gate array 22, and a read/write IC 24 and buffer RAM 25, as well as to the CPU bus 18. The HDC 21 is also connected to the host 2 via a host interface 3. The HDC 21 and gate array 22 have respective control registers. The control registers are provided in an area in the address space of the CPU 17. The CPU 17 controls the HDC 21 or gate array 22 by executing reading/writing at the area. The HDC 21 has an interface control function for receiving a command supplied from the host 2, and for controlling data transmission between the host 2 and HDC 21. The HDC 21 also has a disk control function for controlling data transmission between the disk 11 and HDC 21, and a buffer control function for controlling the buffer RAM 25. The gate array 22 generates various signals necessary to control the HDD 1.

The head 12 is connected to a head IC (head amplifier circuit) 23. The head IC 23 includes a read amplifier (not shown) for amplifying a read signal read by the head 12, and a write amplifier for converting write data into a write current. The head IC 23 is connected to a read/write IC (read/write channel) 24. The read/write IC 24 executes various types of signal processing, such as A/D (Analog/Digital) conversion of a read signal, encoding write data and decoding read data, etc.

In the HDD 1, when a read command from the host 2 is executed, a data signal recorded in the area on the disk 11 designated by the command is read by the head 12. The signal (analog signal) read by the head 12 is amplified by the head IC 23 and decoded by the read/write IC 24. The HDC 21 processes the data, decoded by the read/write IC 24, on the basis of a control signal from the gate array 22, thereby generating data (read data) to be transferred to the host 2. This data is once stored in the buffer RAM 25, and is then transferred to the host 2 by the HDC 21. On the other hand, when a write command from the host 2 is executed, data (write data) is transferred from the host 2 to the HDC 21. The write data transferred from the host 2 is once stored in the buffer RAM 25, and is then transferred to the read/write IC 24 by the HDC 21 on the basis of a control signal from the gate array 22. The read/write IC 24 encodes the write data transferred thereto. The encoded write data is converted by the head IC 13 into a write signal, which is written by the head 12 to the area on the disk 11 designated by the command.

As described above, the buffer RAM 25 has a buffer area (not shown) for temporarily storing data transferred between the host 2 and the HDC 21 of the HDD 1. The buffer RAM 25 also has a defective sector management information area (not shown). The defective sector management information area stores a copy of the defective sector management information stored in the management area 11c of the disk 11 when the HDD 1 is powered on. When a target sector is accessed, the CPU 17 refers to the defective sector management information stored in the defective sector management information area. As a result, if the target sector is defective, CPU 17 can recognize an alternate sector for it at a high speed.

The operation of the HDD 1 of FIG. 1 will now be described. In the embodiment, the HDD 1 is used as an AV HDD for AV data to be processed in real time, which is represented by digital music or video data. In this case, a defective sector on the disk 11, which is detected after the HDD 1 is shipped, is a significant obstacle to AV systems that employ the HDD 1. Therefore, it is necessary to verify any sector that may be defective. If a defective sector that cannot be restored is detected by the verification process, it is necessary to execute an alternate process for allocating a normal sector on the alternate area 11b, in place of the defective sector.

In conventional HDDs, since they have been used as external storages for computers, restoration of a sector that may be defective is attempted in a verification process. Therefore, in conventional HDDs, retry (error retry) is repeated up to the maximum allowable times defined by the control program. In this case, errors are considered transient, and hence no alternate process is executed if an error sector is restored. Only if an error sector is not restored even after retry is repeated the maximum allowable times is it considered a defective sector and substituted for a normal sector.

On the other hand, in the embodiment, the time period for retry (or the number of occasions of retry) is dynamically set, thereby verifying a sector that may be defective. This is done in order to realize realtime access to the AV data designated by a read/write command from the host 2. In the embodiment, the following first and second procedures are employed as a series of procedures that include the sector verification process and alternate process.

[First Procedure]

Figure 2:
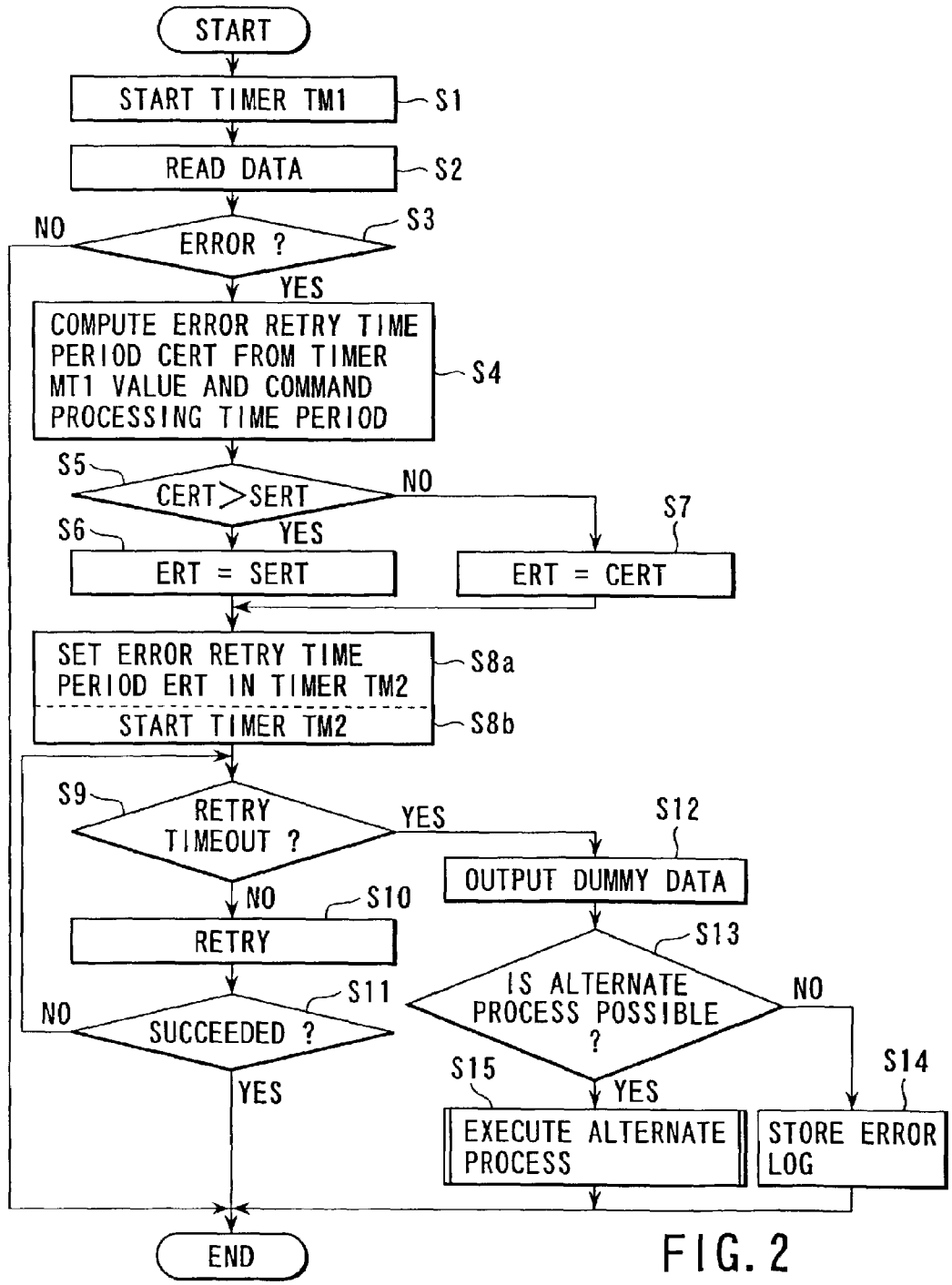
FIG. 2 is a flowchart useful in explaining a first processing procedure employed in the embodiment.

Referring first to the flowchart of FIG. 2, the first procedure will be described, using execution of a read command from the host 2 as an example. In the HDD 1 of FIG. 1, data stored in a number of sectors designated by a read command from the host 2 is sequentially read in units of sectors. The CPU 17 of the HDD 1 operates in accordance with a control program 190 stored in the ROM 19, and starts the timer TM1 when starting the reading of each sector (step S1). After that, the CPU 17 controls the HDC 21 to read a target sector (step S2).

If an error (sector error) occurs during the reading of the target sector at the step S2 (step S3), the CPU 17 computes an error retry time period CERT on the basis of the present value T of the timer TM and the command processing time period CT for one sector (step S4). The present value T of the timer TM1 indicates the time elapsed since start of the error sector reading. The command processing time period CT for one sector is a time period that can be used to read a sector requested by the host 2. The error retry time period CERT is a time period that can be used to restore an error sector. The error retry time period CERT is given by $$CERT = CT - T \qquad (1)$$

Thereafter, the CPU 17 compares the computed error retry time period CERT with a predetermined error retry time period SERT (step S5). If CERT>SERT, the CPU 17 uses the predetermined error retry time period SERT as an actually used error retry time period ERT (step S6). If, on the other hand, CERT≦SERT, the CPU 17 uses the computed error retry time period CERT as the actually used error retry time period ERT (step S7). Subsequently, the CPU 17 sets, in the timer TM2, the error retry time period ERT determined at the step S6 or S7, thereby starting the timer TM2 (steps S8a and S8b). After measuring the set time period, the timer TM2 outputs a timeout signal.

After starting the timer TM2, the CPU 17 proceeds to a step S9, where the CPU 17 determines whether or not the timer TM2 has output the timeout signal, i.e., a timeout occurs. If no timeout occurs, the CPU 17 executes error retry, assuming that the error retry time period ERT does not elapse (step S10). If a target sector can be read normally as a result of error retry, i.e., if retry has succeeded (step S11), the CPU 17 finishes the reading of the target sector. If retry has thus succeeded, the time period required for retry does not exceed the determined error retry time period ERT, i.e., the maximum allowable time period for restoration computed on the basis of the command processing time period CT designated by the host. Accordingly, in the embodiment, AV data for use in AV HDDs can be reliably processed in real time.

On the other hand, if a target sector could not be normally read, i.e., if retry has failed (step S11), the CPU 17 returns to the step S9. At the step S9, the CPU 17 again determines whether or not a retry timeout occurs. If no timeout occurs, the CPU 17 re-executes error retry (step S10). If a timeout occurs, the CPU 17 outputs, to the HDC 21, dummy data as read data from the disk 11 (step S12). The HDC 21 temporarily stores, into the buffer RAM 25, the dummy data as read data from a target sector. The control can be modified such that a user of the host 2 designates whether or not dummy data should be used if a retry timeout occurs. In this modification, at the step S12, the CPU 17 determines, on the basis of the designated data, whether or not dummy data should be output, if a retry timeout occurs (step S9).

After outputting the dummy data, the CPU 17 determines, from the command processing time period CT limited to each sector, whether or not an alternate process can be executed (step S13). As is apparent, if the error retry time period CERT computed at the step S4 is determined to be used as the actually used error retry time period ERT, the command processing time period CT elapses when the timer TM2 outputs a timeout signal. In other words, no time is left for the alternate process. At this time, the CPU 17 proceeds to a step S14 without executing the alternate process, in order to finish the reading of data requested by the host 2 within the command processing time period designated by the host 2. At the step S14, the CPU 17 stores an error log into the error log area 200 of the RAM 20, thereby finishing the reading of one sector. This error log contains the command from the host 2 which designates reading/writing (in this case, reading) of data from/to sectors including the error sector, the address (sector number) of the error sector, and information on the command processing time period CT for one sector.

Thus, the CPU 17 can complete the reading of data requested by the host 2 within the command processing time period CT designated by the host 2. Since, however, the sector(s) that may be defective remains on the disk 11, it is possible that an error may again occur when the sector is read next time. In light of this, in the embodiment, the sector that may be defective is subjected, in another occasion, to verification for determining whether it is really defective. If it is determined to be defective, it is subjected to a procedure for alternate. This procedure is the second one. The second procedure is executed in accordance with each error log in the error log area 200 when the HDD 1 is not busy, for example, when the HDD 1 is in an idle state described later.

On the other hand, if the predetermined error retry time period SERT is determined to be used as the actually used error retry time period ERT, when the timer TM2 outputs a timeout signal, the command processing time period CT has not yet elapsed. In this case, it is possible that a time period that can be used for the alternate process remains. If such a time period remains, the CPU 17 determines that the alternate process can be executed (step S13), and executes a known alternate process (step S15). In the alternate process, the CPU 17 determines that the sector is defective, and allocates, in place of the defective sector, an arbitrary non-use sector as an alternate sector, which is located in the alternate area 11b of the disk 11. In the embodiment, defective sector management information that contains a pair of addresses assigned to the defective sector and alternate sector is stored in the defective sector management information area of the buffer RAM 25. If a target sector is defective, the CPU 17 refers to the defective sector management information stored in the defective sector management information area, thereby recognizing an alternate sector for the defective sector at high speed. The defective sector management information stored in the management area 11c of the disk 11 is updated on the basis of the defective sector management information stored in the defective sector management information area of the buffer RAM 25. This updating process is executed when, for example, the HDD 1 is in the idle state.

[Second Procedure]

Figure 3A:
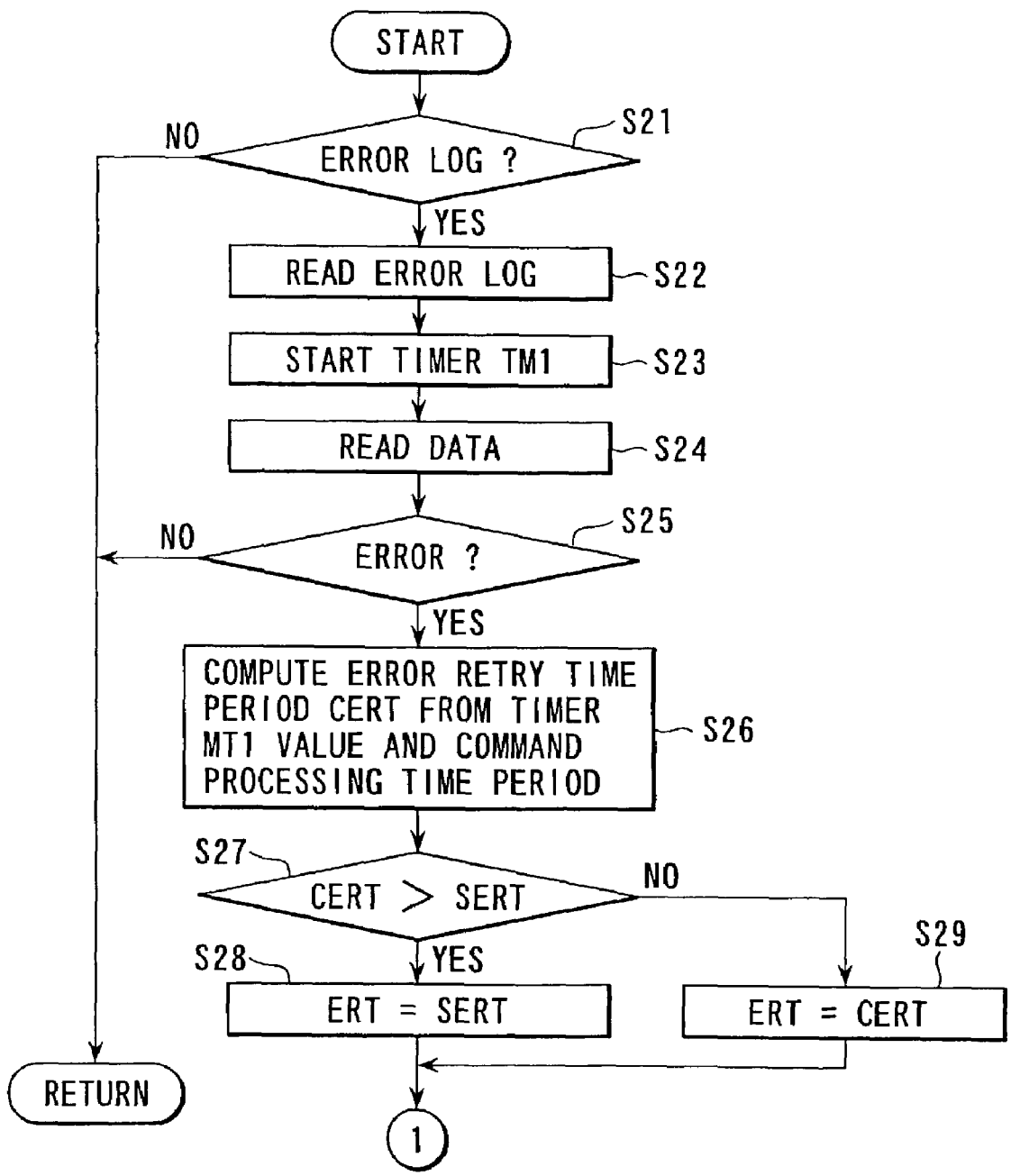
FIGS. 3A and 3B are a flowchart useful in explaining a second processing procedure employed in the embodiment.
Figure 3B:
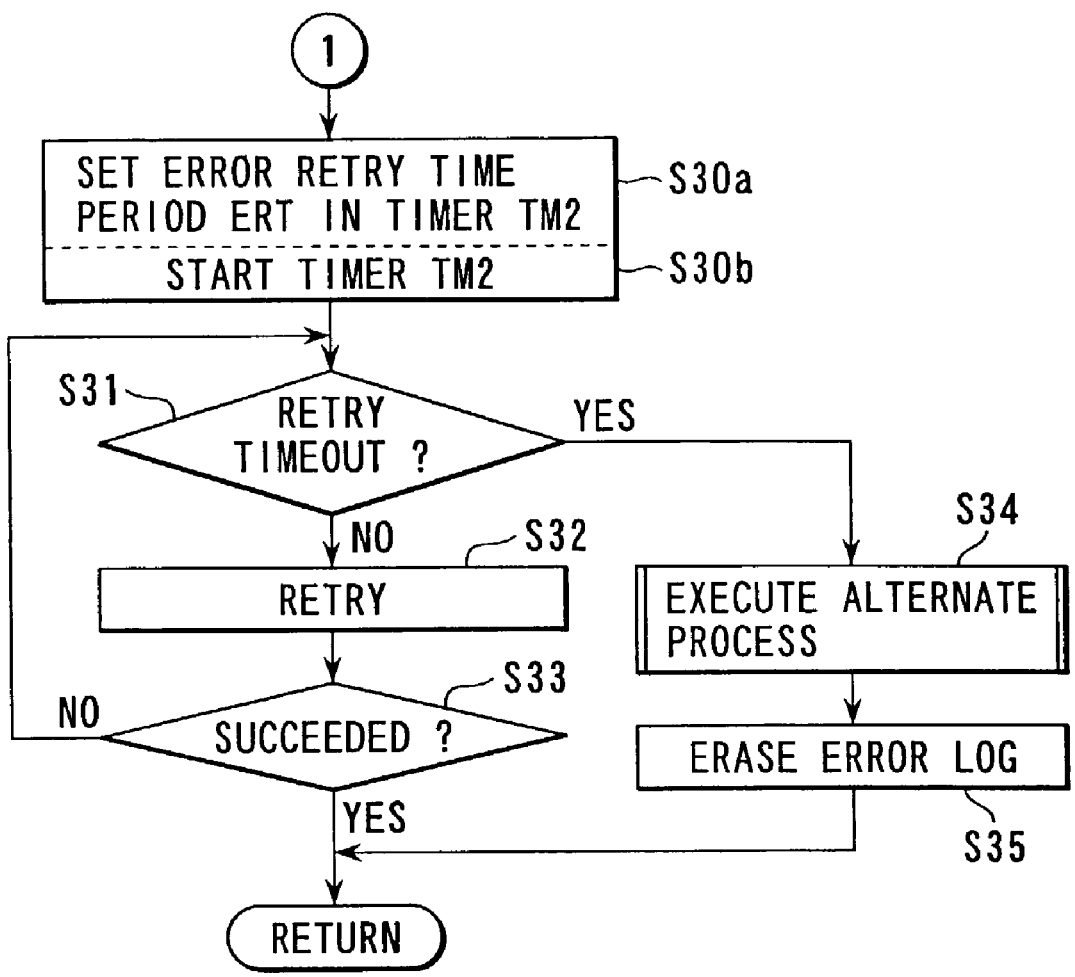

Referring to the flowchart of FIGS. 3A and 3B, the second procedure will be described. In the embodiment, the second procedure is automatically executed when the HDD 1 is in the idle state. The idle state of the HDD 1 means a state in which while the SPM 13 is rotating, the head 12 is retrieved in a predetermined retrieve portion (not shown), since no read/write command is supplied for longer than a predetermined time period. In this state, it is very possible that power supplied to some circuits in the HDD 1 is suspended, to save power. The head retrieve portion is, for example, the parking area of a ramp.

Firstly, the CPU 17 accesses the error log area 200 of the RAM 20, thereby determining whether or not one or more error logs are stored (step S21). If one or more errors are logged, the CPU 17 fetches one error log from the error log area 200 (step S22). Each error log contains the information concerning the sector whose retry has failed in the first procedure. Specifically, each error log contains information concerning the command that has designated reading/writing of data from/to sectors including the sector whose retry has failed, the address of the sector, and the command processing time period CT for one sector requested by the host 2. Assume that the command in each error log is a read command.

Upon fetching one error log, the CPU 17 starts the timer TM1 as in the standard case where a read/write operation is executed in units of sectors (step S23). Subsequently, the CPU 17 controls the reading of the sector whose retry has failed, on the basis of the read command and address of the sector contained in the error log (step S24). At the step S24, the CPU 17 controls the actuator 14 via the driver IC 16 so that the head 12 is positioned on the track on the disk 11, which includes the sector whose retry has failed. After that, the CPU 17 controls the HDC 21 so as to read data from the sector whose retry has failed, i.e., the sector that may be defective.

If an error occurs in the reading process at the step S24 (step S25), the CPU 17 computes the error retry time period CERT from the present value T of the timer TM1 and the command processing time period CT for one sector, as at the step S4 for the first procedure (step S26). In other words, the CPU 17 computes the error retry time period CERT from the elapsed time T starting at the start of the reading of the error sector, and the command processing time period CT for one, and the command processing time period CT for one sector in the error log, using the aforementioned equation (1).

After that, the CPU 17 compares the computed error retry time period CERT with a predetermined error retry time period SERT (step S27). If CERT>SERT, the CPU 17 uses the predetermined error retry time period SERT as the error retry time period ERT (step S28). If, on the other hand, CERT≦SERT, the CPU 17 uses the computed error retry time period CERT as the error retry time period ERT (step S29). Subsequently, the CPU 17 sets, in the timer TM2, the error retry time period ERT determined at the step S28 or S29, thereby starting the timer TM2 (steps S30a and S30b).

After starting the timer TM2, the CPU 17 executes error retry (step S32) if the timer TM2 does not output a timeout signal (step S31). If the sector that was suspected to be defective could be normally read in the retry process (step S33), the CPU 17 finishes the error log process. In other words, the CPU 17 finishes the error log process if the sector that was suspected to be defective could be normally read within the error retry time period ERT computed on the basis of the command processing time period CT. Thereafter, the CPU 17 returns to the step S21 if it is still in the idle state. As is apparent, when the host 2 has requested the reading of AV data from sectors including the sector whose retry has succeeded at the step S32, the sector can be read within the command processing time period CT designated by the host 2. In short, the sector whose retry has succeeded at the step S32 can be processed in real time.

On the other hand, if the sector that was suspected to be defective could not be normally read (step S33), the CPU 17 returns to the step S31. At the step S31, the CPU 17 again determines whether or not a timeout signal is output from the timer TM2, i.e., whether or not a retry timeout occurs. If no timeout occurs, the CPU 17 again executes error retry (step S32). If, on the other hand, a timeout occurs, the CPU 17 determines that the sector, which was suspected to be defective, is actually defective. At this time, the CPU 17 executes an alternate process in which an arbitrary non-use sector located in the alternate area 11b of the disk 11 is allocated in place of the defective sector (step S34). Attention should be paid to the case where the error retry time period ERT set in the timer TM2 is the error retry time period CERT computed on the basis of the command processing time period CT. In this case, when a timeout occurs, the predetermined error retry time period SERT has not yet elapsed. However, in the embodiment, when a timeout occurs, the alternate process is executed even if the predetermined error retry time period SERT has not yet elapsed. The reason for this will be described.

The reading of a sector suspected to be defective may succeed if retry is continued for more than the time period CERT but not more than the predetermined error retry time period SERT. However, even if this sector could be normally read after the time period CERT, the command processing time period CT designated by the host 2 has already elapsed. Therefore, if the host 2 again designates the reading of AV data from sectors including the sector, the sector may not be read within the command processing time period CT designated by the host 2. In other words, realtime processing of the AV data may not be realized. In light of this, in the embodiment, such a sector as the above is subjected to an alternate process. This structure prevents recurrence of an error in a sector temporarily restored by the retry process, thereby enabling a realtime process on AV data accessed. Moreover, in the embodiment, the error log process including the alternate process is executed when the HDD 1 is in the idle state. Accordingly, the error log process does not adversely affect the operation of the HDD 1. When the alternate process is executed, no data is written to the sector (alternate sector) allocated in place of a defective sector. However, if data is newly written to the alternate sector, it can be normally read therefrom.

After executing the alternate process, the CPU 17 erases the processed error log from the error log area 200 (step S35), thereby finishing the processing of one error log. If the CPU 17 is still in the idle state, it returns to the step S21.

The operation of the HDD 1 of FIG. 1 has been described, using an example where the command from the host 2 is a read command. However, even if the command from the host 2 is a write command, the same operation is executed by the HDD 1 except that a write operation is executed in place of the read operation and no dummy data is transferred.

Figure 4:
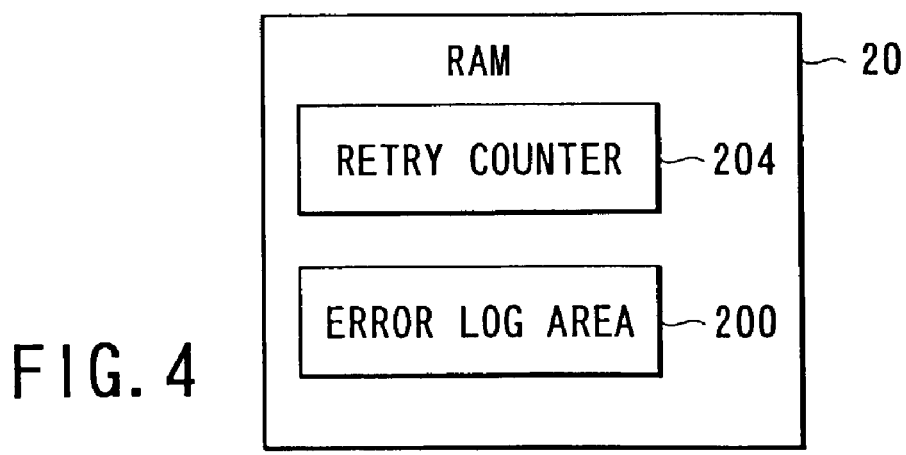
FIG. 4 is a view illustrating a retry counter 204 provided in a RAM 20 and used in place of a timer TM2 in FIG. 1 to manage an error retry time period.

Further, in the embodiment, it is determined that the termination of the retry process (forced termination) is executed, when the time period required for the error retry process exceeds the set error retry time period ERT. However, this time-based determination can be changed to a determination based on the number of occasions of retry. This can be realized, for example, by providing, in the RAM 200, a retry counter 204 realized using software, as is shown in FIG. 4. With this structure, the number of occasions of retry is counted by the counter 204 in the manner described below. Firstly, the CPU 17 sets the maximum allowable number of occasions of retry in the retry counter 204. Each time the CPU 17 executes the retry process, the value of the retry counter 204 is decremented by one. If retry does not succeed even when the value of the retry counter 204 is 0, the CPU 17 executes the same process as that executed when a retry timeout occurs.

The maximum allowable number ERN of occasions of retry within the error retry time period ERT is given by $$ERN = \text{the integral part of } (ERT/Ts) \quad (2)$$

where Ts represents the time period that is required for the SPM 13 to rotate through 360 degrees, and is computed in the following manner from the standard rotational speed of the SPM 13. If the standard rotational speed of the SPM 13 is 4,200 rpm, Ts is 60×1.000 (ms)/4,200≈14 ms. The time period Ts required for one rotation of the SPM 13 corresponds to the time period required for one rotation of the disk 11. Accordingly, retry cannot be repeated within a time interval shorter than Ts. In other words, Ts is the time period necessary for one error retry operation.

A counter (hardware counter) generally employed in the CPU 17 can be used as a retry counter in place of the software retry counter 204 on the RAM 20. Further, the retry counter can be used as a counter for incrementing the counter value by one each time retry is executed. In this case, each time the retry counter adds up the number of occasions of retry, it is determined whether or not the resultant counter value exceeds the maximum allowable number REN.

In the above-described embodiment, the invention is applied to an HDD (Hard Disk Drive). However, the invention is also applicable to disk storage apparatuses capable of read/write operations, other than HDDs, such as optical disk apparatuses, magneto-optical disk drives, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive apparatus for audio visual data in which an arbitrary sector provided in an alternate area on a disk is allocated as an alternate sector for a defective sector on the disk, comprising:
    means for computing a maximum allowable time period for restoration of a sector in which an error occurs, on the basis of a command processing time period designated by a host using the disk storage apparatus, when the error occurs upon access to the disk designated by a command supplied from the host, the command processing time period enabling realtime processing;
    means for determining use of the computed maximum allowable time period as a maximum error retry time period;
    means for controlling retry of the sector, in which the error occurs, within the determined maximum error retry time period;
    means for storing an error log in a storage device, if retry of the sector, in which the error occurs, does not succeed within the determined maximum error retry time period, the error log including the command, an address assigned to the sector in which the error occurs, and the command processing time period designated by the host, the sector in which the error occurs being determined to be possibly defective;
    means for sequentially reading non-processed error logs stored in the storage device;
    means for controlling access to a sector indicated as possibly defective by each of the non-processed error logs whenever said each of the non-processed error logs is read; and
    means for allocating an arbitrary sector in the alternate area on the disk in place of the sector indicated as possibly defective, if the retry does not succeed within the determined maximum error retry time period, the sector indicated as possibly defective being determined to be really defective.

2. A disk drive apparatus for audio visual data in which an arbitrary sector provided in an alternate area on a disk is allocated as an alternate sector for a defective sector on the disk, comprising:
    means for computing a maximum allowable time period for restoration of a sector in which an error occurs, on the basis of a command processing time period designated by a host using the disk storage apparatus, when the error occurs upon access to the disk designated by a command supplied from the host, the command processing time period enabling realtime processing;
    means for determining use of the computed maximum allowable time period as a maximum error retry time period; and
    means for controlling retry of the sector, in which the error occurs, within the determined maximum error retry time period,
    wherein the computing means computes the maximum allowable time period for restoration by subtracting, from the command processing time period, an elapsed time period ranging from start of access to the sector, in which the error occurs, to occurrence of the error.

3. A disk drive apparatus for audio visual data in which an arbitrary sector provided in an alternate area on a disk is allocated as an alternate sector for a defective sector on the disk, comprising:
    means for computing a maximum allowable time period for restoration of a sector in which an error occurs, on the basis of a command processing time period designated by a host using the disk storage apparatus, when the error occurs upon access to the disk designated by a command supplied from the host, the command processing time period enabling realtime processing;
    means for determining use of the computed maximum allowable time period as a maximum error retry time period;
    means for controlling retry of the sector, in which the error occurs, within the determined maximum error retry time period; and
    means for comparing the computed maximum allowable time period for restoration with a predetermined error retry time period, and wherein the determining means determines use of the computed maximum allowable time period as the maximum error retry time period if the comparing means detects that the computed maximum allowable time period for restoration is shorter than the predetermined error retry time period.

4. A disk storage apparatus for audio visual data according to claim 3, wherein the determining means determines use of the predetermined time period as the maximum error retry time period if the comparing means detects that the computed maximum allowable time period for restoration is not shorter than the predetermined error retry time period.

5. A disk drive apparatus for audio visual data comprising:
    a disk including a user area, which stores data, and an alternate area to be allocated in place of defective sectors;
    a CPU that computes a maximum allowable time period for restoration on the basis of a command processing time period designated by a host using the disk storage apparatus, if an error occurs in a sector on the disk during access to the disk designated by a command supplied from the host, thereby determining that the maximum allowable time period for restoration is used as a maximum error retry time period, the command processing time period enabling realtime processing, the CPU controlling retry of the sector, in which the error occurs, within the determined maximum error retry time period; and
    a storage device storing data,
    and wherein:
        if retry of the sector, in which the error occurs, does not succeed within the determined maximum error retry time period, the CPU determines that the sector, in which the error occurs, is possibly defective, and stores, in the storage device, an error log which includes the command, an address assigned to the sector in which the error occurs, and the command processing time period designated by the host;
        when the disk storage apparatus is in a predetermined state, the CPU sequentially reads non-processed error logs stored in the storage device, and controls access to a sector indicated as possibly defective by each of the non-processed error logs whenever said each of the non-processed error logs is read; and
        the CPU controls retry of the sector which is possibly defective, if an error occurs when the sector which is possibly defective is accessed, determines that the sector which is possibly defective is really defective, if the retry does not succeed within the determined maximum error retry time period, and allocates an arbitrary sector in the alternate area of the disk in place of the defective sector.

6. A disk storage apparatus for audio visual data according to claim 5, wherein the predetermined state is an idle state.

7. A retry method executed when an error occurs in a sector on a disk incorporated in a disk storage apparatus for audio visual data, in which an arbitrary sector in an alternate area provided on the disk is allocated as an alternate sector for a defective sector, comprising:

computing a maximum allowable time period for restoration on the basis of a command processing time period designated by a host using the disk storage apparatus, if an error occurs in a sector on the disk during access to the disk designated by a command supplied from the host, the command processing time period enabling realtime processing;

determining that the computed maximum allowable time period for restoration is used as a maximum error retry time period;

executing retry of the sector, in which the error occurs, within the determined maximum error retry time period;

storing an error log in a storage device, if retry of the sector, in which the error occurs, does not succeed within the determined maximum error retry time period, the error log including the command, an address assigned to the sector in which the error occurs, and the command processing time period designated by the host, the sector in which the error occurs being determined to be possibly defective;

sequentially reading non-processed error logs stored in the storage device;

accessing a sector indicated as possibly defective by each of the non-processed error logs, whenever said each of the non-processed error logs is read;

again executing retry of the sector which may be defective, if an error occurs when the sector which may be defective is accessed; and allocating an arbitrary sector in the alternate area on the disk in place of the sector indicated as possibly defective, if the retry does not succeed within the determined maximum error retry time period, the sector indicated as possibly defective being determined to be really defective.

8. A retry method executed when an error occurs in a sector on a disk incorporated in a disk storage apparatus for audio visual data, in which an arbitrary sector in an alternate area provided on the disk is allocated as an alternate sector for a defective sector, comprising:

computing a maximum allowable time period for restoration on the basis of a command processing time period designated by a host using the disk storage apparatus, if an error occurs in a sector on the disk during access to the disk designated by a command supplied from the host, the command processing time period enabling realtime processing;

determining that the computed maximum allowable time period for restoration is used as a maximum error retry time period; and executing retry of the sector, in which the error occurs, within the determined maximum error retry time period, wherein the maximum allowable time period for restoration is computed by subtracting, from the command processing time period, an elapsed time period ranging from start of access to the sector, in which the error occurs, to occurrence of the error.

9. A retry method executed when an error occurs in a sector on a disk incorporated in a disk storage apparatus for audio visual data, in which an arbitrary sector in an alternate area provided on the disk is allocated as an alternate sector for a defective sector, comprising:

computing a maximum allowable time period for restoration on the basis of a command processing time period designated by a host using the disk storage apparatus, if an error occurs in a sector on the disk during access to the disk designated by a command supplied from the host, the command processing time period enabling realtime processing;

determining that the computed maximum allowable time period for restoration is used as a maximum error retry time period; and executing retry of the sector, in which the error occurs, within the determined maximum error retry time period, wherein the determining includes determining use of the computed maximum allowable time period as the maximum error retry time period if the computed maximum allowable time period for restoration is shorter than a predetermined error retry time period.

10. A retry method according to claim 9, wherein the determining includes determining use of the predetermined time period as the maximum error retry time period if the computed maximum allowable time period for restoration is not shorter than the predetermined error retry time period.

* * * * *